May 13, 1952 R. L. LEIGH 2,596,570
DAMPER OPERATING AND SECURING STRUCTURE
Filed July 22, 1949
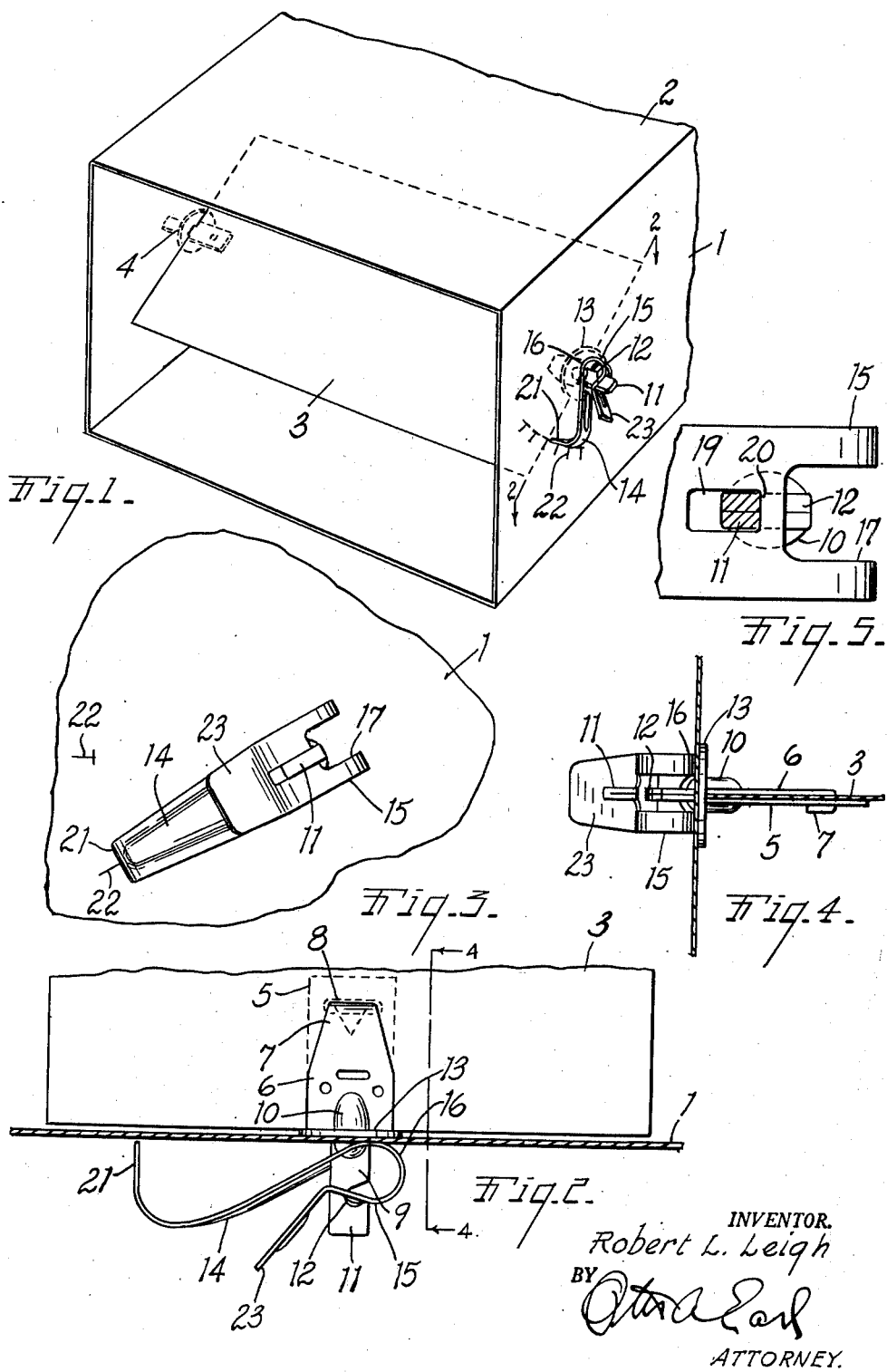
INVENTOR.
Robert L. Leigh
BY
ATTORNEY.

Patented May 13, 1952

2,596,570

UNITED STATES PATENT OFFICE 2,596,570

DAMPER OPERATING AND SECURING STRUCTURE

Robert L. Leigh, Coopersville, Mich., assignor to Air Control Products, Inc., Coopersville, Mich.

Application July 22, 1949, Serial No. 106,280

6 Claims. (Cl. 126—295)

This invention relates to improvements in damper regulators.

The main objects of this invention are:

First, to provide a damper regulator which enables the very rapid installation of a damper in a conduit and at the same time effectively supports the damper in its adjusted position and prevents rattling or vibration thereof.

Second, to provide a damper regulator installation in which the damper is frictionally held in its adjusted positions without the use of threaded clamping parts and at the same time is simple and economical to produce and install.

Objects relating to details and economies of the invention will appear from the description to follow. The invention is pointed out in the claims.

A preferred embodiment of the invention is illustrated in the accompanying drawing, in which:

Fig. 1 is a perspective view illustrating the regulator of my invention as applied to a damper blade mounted within a conduit.

Fig. 2 is an enlarged fragmentary view partially in section on a line corresponding to line 2—2 of Fig. 1.

Fig. 3 is a fragmentary side elevational view.

Fig. 4 is a fragmentary view in section on a line corresponding to line 4—4 of Fig. 2.

Fig. 5 is an enlarged fragmentary view illustrating the engagement of the handle spring arm with the journal.

In the accompanying drawings, 1 represents a side wall of a conduit 2 such as a heating or air circulating conduit. 3 is a damper plate which is supported at one end by the so-called "tail" journal member 4 which forms no part of my present invention except that broadly considered it constitutes a support for the damper plate.

The damper plate regulator of my invention comprises a pair of coacting damper plate engaging members 5 and 6, the member 5 having a slot 8 therein through which the tongue 7 of the member 6 is arranged. The members 5 and 6 are arranged on opposite sides of the damper plate 3 and the tongue 7 inserted through the plate and the slot 8 in the member 5 and clinched. These attaching members have a journal 9 formed integrally therewith and adapted to project through a suitable bearing opening in the wall 1. The journal is provided with a rounded bearing portion 10 and a flattened outer portion 11 having a notch-like recess 12 in one edge thereof. The thrust disc 13 is arranged on the journal in frictional engagement with the inner side of the wall and in supported engagement with the attaching members.

The handle 14 is formed of springable material and has a spring arm 15 integrally connected thereto through the curved bight portion 16. In effect the combined handle and spring arm is of general U-shape. This bight portion and handle are slotted at 17 to receive the projecting portion of the journal when the handle is presented edgewise thereof. The spring arm is provided with a slot 19 adapted to receive the journal, the portion of the arm 20 at the inner end of the slot being engageable with the recess 12 in the journal with the arm under spring tension or compression.

With parts thus arranged the spring arm acts to press the handle against the outer side of the conduit wall 1 and to apply pulling stress to the journal urging the friction disc 13 against the inner side of the wall. This provides a very substantial spring thrust frictional engagement with the wall holding the damper in its adjusted positions and against rattling. The handle is desirably provided with a pointer 21 and the wall with indicia 22 with which the pointer is associated to indicate the position of the damper within the conduit. The end 23 of the spring arm serves as a finger piece facilitating the easy engagement of the handle with the journal and the securing of the parts under suitable frictional stress.

It is contemplated that the regulator shall be applied to the damper by the workmen on the job, holes being formed in the conduit to properly position the damper plate and the damper journals inserted through the holes. The handle and its combined spring arm is then applied which secures the parts in assembled relation relative to the conduit.

I have illustrated and described a highly practical embodiment of my invention. I have not attempted to illustrate or describe certain modifications or adaptations which I contemplate as it is believed that this disclosure will enable those skilled in the art to embody or adapt my invention as may be desired.

Having thus described my invention, what I claim as new and desire to secure by Letters Patent is:

1. A regulator for a damper plate comprising, a pair of coacting damper engaging members having portions adapted to be secured to opposite edges of the plate and having journals spaced outwardly of their plate engaging portions adapted to support the plate in a conduit by extending through opposite walls of the conduit, one of said journals having a recess in one side spaced outwardly from its plate engaging portion, and a handle having one end bent transversely outwardly into a bowed U-shaped spring arm, the bight connecting said handle and arm being slotted and receiving the journal of said one member transversely of the handle and outwardly from the plate engaging portion of said one member, said arm having an opening therein receiving the outer end of said one journal, the portion of the arm at one edge of the opening being engaged in said recess with the arm under spring stress whereby the inner end of the handle is urged inwardly of the journal and adapted to thrust inwardly against the outer side of a conduit wall through which said one journal extends in opposition to the outward thrust of the arm on said one member.

2. The combination with an air conduit having opposed flat walls with bearing openings therein and a damper plate within the conduit, of a support and regulator for the damper plate comprising a pair of coacting damper engaging members attached to the opposite sides of said plate, journals formed integrally on said members and journaled in said bearing openings and having flattened outer portions projecting outwardly from said walls and with a notch in one edge thereof, thrust discs arranged on said journals within the conduit in supported thrust engagement with said members, a combined handle and spring arm comprising a strip of springable metal bent into U-shape with one branch thereof forming the spring arm and the other branch extended to form the handle, the bight of said strip having a longitudinal slot therein extending into each branch thereof, the projecting portion of one of said members being received in said slot, the outer spring arm branch of said strip having an aperture therein spaced longitudinally from the adjacent end of said slot, that portion of said outer branch between said aperture and the end of the slot being engaged with said notch in said one member with said spring arm under spring stress whereby the inner handle branch of said strip is urged against the outer side of the conduit wall and that portion of said one member located within the conduit and the thrust disc associated therewith is urged outwardly against the inner side of the conduit, the handle branch of said strip being provided with a pointer at its outer end.

3. The combination with an air conduit having opposed flat walls with bearing openings therein and a damper plate within the conduit, of a support and regulator for the damper plate comprising a pair of coacting damper engaging members attached to the opposite sides of said plate, journals formed integrally on said members and journaled in said bearing openings, one of said members having a flattened outer portion projecting outwardly from said walls and with a notch in one edge thereof, a combined handle and spring arm comprising a strip of springable metal bent into U-shape with one branch thereof forming the spring arm and the other branch extended to form the handle, the bight of said strip having a longitudinal slot therein extending into each branch thereof, the projecting portion of said one of said members being received in said slot, the outer spring arm branch of said strip having an aperture therein spaced longitudinally from the adjacent end of said slot and embracing the outer end of said flattened portion, that portion of said outer branch between said aperture and the end of the slot being engaged with said notch in said one member with said spring arm under spring stress whereby the inner handle branch of said strip is urged against the outer side of the conduit wall and that portion of said one member located within the conduit is urged outwardly against the inner side of the conduit.

4. A regulator and support for a damper plate comprising a pair of coacting damper engaging members adapted to be secured to opposite edges of the plate, journals formed integrally with said members outwardly of their plate engaging portions and having flattened outer ends with a notch in one edge thereof, a thrust disc positioned around one of said journals to be in thrust engagement between said one of said members and the inside of a conduit wall through which the journal is disposed, a combined handle and spring arm comprising a U-shaped strip of metal with one branch thereof forming the spring arm and the other branch thereof extended to form the handle, the bight of said strip having a slot therein extending into each branch, said spring arm having an opening therein adjacent the end of said slot and receiving the outer flattened portion of said journal with the portion of said spring arm between said opening and said slot received in said notch, that portion of the journal inwardly of the notch being extended through the inner end of said slot whereby the inner end of the handle is urged inwardly toward said plate and adapted to thrust against the outer side of a conduit wall in opposition to the thrust disc urged outwardly by said spring arm.

5. A regulator and support for a damper plate comprising a damper engaging member adapted to be secured to the edge of the plate, a journal formed integrally with said member outwardly of its plate engaging portion and having a flattened outer end with a notch in one edge thereof, a combined handle and spring arm comprising a U-shaped strip of metal with one branch thereof forming the spring arm and the other branch thereof extended to form the handle, the bight of said strip having a slot therein extending into each branch, said spring arm having an opening therein adjacent the end of said slot and receiving said flattened outer end with the portion of said spring arm between said opening and said slot received in said notch, that portion of the journal inwardly of the notch being extended through the inner end of said slot whereby the inner end of the handle is urged inwardly toward said plate and adapted to thrust against the outer side of a conduit wall.

6. A regulator and support for a damper plate comprising a damper engaging member adapted to be secured to the edge of the plate, a journal formed integrally with said member outwardly of its plate engaging portion and having a notch in one side thereof near its outer end, a combined handle and spring arm comprising a U-shaped strip of metal with one branch thereof forming the spring arm and the other branch thereof extended to form the handle, the bight of said strip having a slot therein extending into each branch, said spring arm having an opening therein adjacent the end of said slot and receiving the outer portion of said journal with the portion of said spring arm at one edge of said opening received in said notch, that portion of the journal inwardly of the notch being extended through the inner end of said slot whereby the inner end of the handle is urged inwardly toward said plate and adapted to thrust against the outer side of a conduit wall in opposition to the damper and the inner portion of said member which are urged outwardly by said spring arm.

ROBERT L. LEIGH.

REFERENCES CITED

The following references are of record in the file of this patent:

UNITED STATES PATENTS

| Number | Name | Date |
| --- | --- | --- |
| 221,770 | Bozenhardt | Nov. 18, 1879 |
| 382,126 | Williams | May 1, 1888 |
| 821,209 | Wagandt | May 22, 1906 |
| 1,013,819 | Rosenberg | Jan. 2, 1912 |
| 2,130,476 | Young | Sept. 20, 1938 |